United States Patent [19]

Lamb

[11] 4,249,329
[45] Feb. 10, 1981

[54] APPARATUS FOR VIEWING AND SORTING PHOTOGRAPHIC SLIDE TRANSPARENCIES

[76] Inventor: Owen L. Lamb, 662 W. Sunnyoaks Ave., Campbell, Calif. 95008

[21] Appl. No.: 79,797

[22] Filed: Sep. 28, 1979

[51] Int. Cl.³ .............................................. G02B 27/02
[52] U.S. Cl. ..................................... 40/361; 353/112; 209/942; 209/606; 40/513
[58] Field of Search ................. 40/361, 508, 509, 513; 353/111, 112; 209/706, 606, 942

[56] References Cited

U.S. PATENT DOCUMENTS

| | | | |
|---|---|---|---|
| 1,081,766 | 12/1913 | Moore | 40/513 |
| 1,946,906 | 2/1934 | Fuller | 209/706 |
| 2,604,008 | 7/1952 | Beekley | 353/112 |
| 2,999,592 | 9/1961 | Brand | 706/209 |
| 3,527,530 | 9/1970 | Hughes | 353/112 |
| 3,618,765 | 11/1971 | Cooper | 209/942 |
| 3,644,033 | 2/1972 | Frystack | 353/111 |
| 3,856,391 | 12/1974 | Hickey et al. | 353/111 |
| 4,173,838 | 11/1979 | Antos | 40/513 |

FOREIGN PATENT DOCUMENTS 2414206 3/1974 Fed. Rep. of Germany ........... 353/112
876368 11/1942 France ...................................... 353/111

Primary Examiner—Gene Mancene
Assistant Examiner—Wenceslao J. Contreras
Attorney, Agent, or Firm—Owen L. Lamb

[57] ABSTRACT

A slide viewer/sorter having a chute oriented at an incline to horizontal which is adapted to receive a photographic slide at one end. The slide drops by force of gravity to a viewing station where it is held by a detent. After viewing the slide the detent is actuated to release the slide which is transported by force of gravity to the lower end of the chute where it drops into a first receptacle. The first receptacle is rotatably mounted so that it can be moved out of the way, thus allowing the slide to drop further down into a second receptacle, having a number of bins. The second receptacle is mounted so that any bin can be positioned under the chute. This allows the operator of the viewer/sorter to sort the slides into two or more different stacks.

27 Claims, 13 Drawing Figures

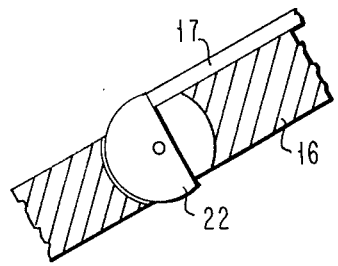
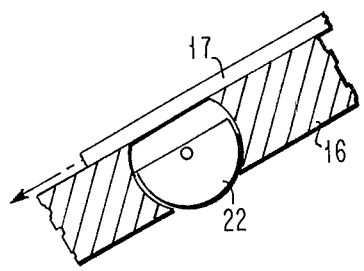
FIG. 3                    FIG. 4
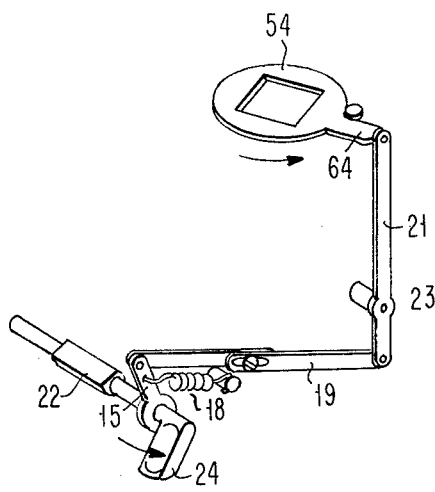
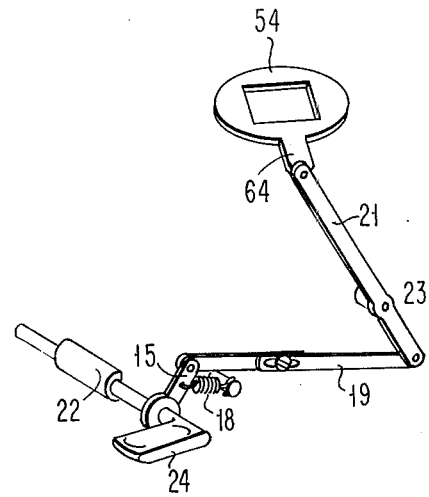
FIG. 8                    FIG. 9

APPARATUS FOR VIEWING AND SORTING PHOTOGRAPHIC SLIDE TRANSPARENCIES

BACKGROUND OF THE INVENTION

The present invention relates to apparatus for viewing and sorting photographic slides, and more particularly, to an apparatus for sorting said slides into two or more separate stacks.

Photographic slides are currently mounted in two-inch by two-inch frames made of cardboard or plastic material for holding the slide during viewing and projection. Furthermore, the transparencies may be mounted between plates of glass. When slides are viewed without projection they are placed in a viewing device, possibly having an optical lens which magnifies the photograph while the slide is being illuminated from the rear by a light source. An example of such a device is the Cook U.S. Pat. No. 2,645,869. In this patent slides are received in an upper compartment in a stack, are carried by means of a slide holder to a viewing compartment which is back-lighted by a light source. The slides are then transported upward and dropped into a lower compartment which receives the viewed slides.

An alternative approach is that of the Rideout U.S. Pat. No. 2,849,814 in which slides are stacked in an upper compartment and drop onto a slide carrier. The slides are then transported horizontally to a viewing station which is back-lighted by a light source. After viewing, the slides are further transported into a lower compartment where the viewed slides are stacked. Neither of these patents provide any means for sorting slides into different stacks.

When sorting slides, photographers generally use a large, back-lighted diffusing screen made of opaque plastic or ground glass. The slides are placed on the screen and viewed by means of a hand-held magnifying glass. Slides can then be sorted on the screen and arranged in a desired sequence. The slides are then manually picked up and placed into different stacks.

Another way of sorting slides is by use of a slide tray during projection. For example, a gravity-fed projector utilizing a circular rotating slide tray, such as that shown in the Robinson U.S. Pat. No. 3,276,314. Slides may be removed from the tray after viewing by projection and placed in stacks or placed in an empty tray slot. This method is cumbersome and requires the use of a projector and a suitable screen.

It is an object of the present invention to provide a simple slide-viewing device which can also be used to sort slides into different stacks.

It is a further object of this invention to provide a slide-viewing device which operates by force of gravity, thereby eliminating the need for complicated mechanisms.

It is a further object of this invention to provide a slide viewing device in which the slides can be viewed by a hand-held magnifying glass.

Briefly, the above objects are accomplished in accordance with the invention by providing a slide viewer having a chute oriented on an incline to horizontal which is adapted to receive a photographic slide at one end thereof. In accordance with an aspect of the invention, a detent is provided for restraining the slide when in a first position and for releasing the slide when in a second position. In this manner, the slide is held at a viewing station for viewing.

In accordance with a further aspect of the invention, a stacking tray is provided at the lower end of the chute, forming a compartment into which viewed slides are dropped after being released by the restraining latch.

In accordance with a still further aspect of the invention, a second tray is positioned below the first tray such that when the first tray is moved away from the end of the chute, the slides drop into the second tray. This way, slides may be sorted into two different stacks, one in the first tray, and one in the second tray.

Additionally, the second tray may be provided with a number of bins, such that slides can be sorted into a number of different stacks by moving the tray to position different bins under the end of the chute.

The invention has the advantage that it contains very few moving parts, relying solely on the force of gravity to transport the slides.

BRIEF DESCRIPTION OF THE DRAWINGS

The foregoing and other objects, features, and advantages of the invention will be apparent from the following detailed description of preferred embodiments of the invention as illustrated in the accompanying drawings wherein:

FIG. 3 is an enlarged sectional view of the slide restraining detent shown in the slide restraining position; and FIG. 4 is an enlarged sectional view of the detent of FIG. 3 shown in the releasing position.

FIGS. 8 and 9 are views of the linkage mechanism shown in FIG. 1 in the load and unload positions, respectively;

DESCRIPTION

Figure 1:
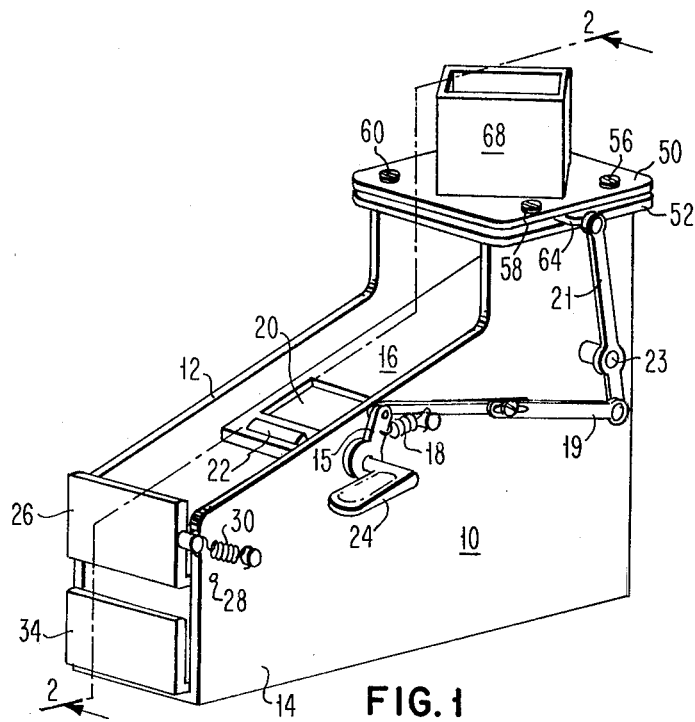
FIG. 1 is a perspective view of one embodiment of the invention.
Figure 2:
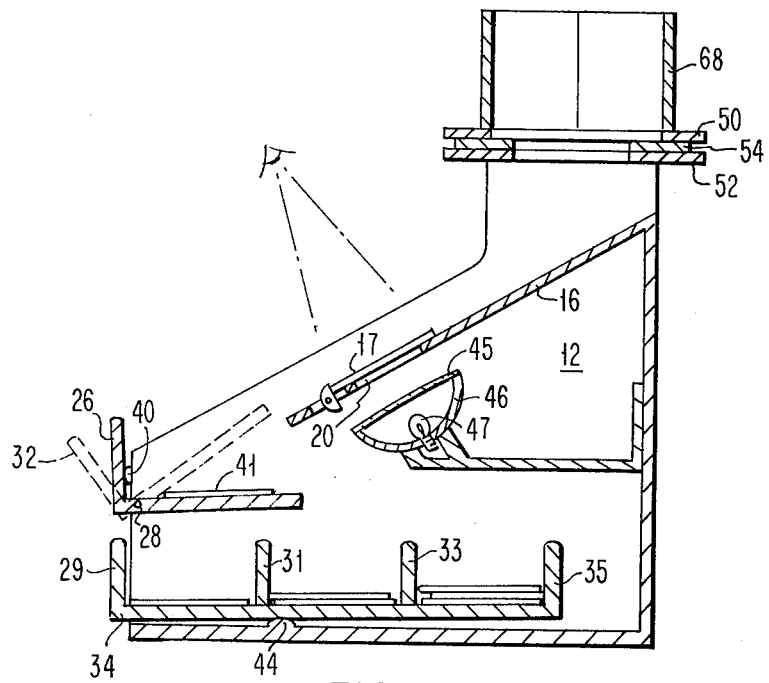
FIG. 2 is a vertical section taken through the slide viewer as indicated by Line 2—2 of FIG. 1.

The slide viewer/sorter is shown in FIG. 1 and in cross-section along the view Lines 2—2 in FIG. 2.

The viewer/sorter has a housing, 10, made of structural material, such as a relatively stiff sheet plastic glued together to form a frame. Within the two walls of the frame, 12 and 14, there is an inclined chute, 16, set at an angle, for example, 60 degrees, with the horizontal. This inclined chute may be made out of transparent plastic or it may have a window, 20, cut therein to form a viewing station through which light can pass to illuminate a transparency held at the viewing station. The transparency may be held over the viewing station window, 20, manually or by means of a detent, 22, which is rotatable by means of a lever, 24, to hold or release the slide, depending upon the position of the lever.

At the lower end of the chute, 16, there is provided a slide receptacle, which preferably is a first L-shaped tray, 26, which is rotatably mounted by means of a pin, 28, which passes through a hole in the housing, 10, and through the tray, 26. A spring, 30, may be provided to hold the tray, 26, in the position shown. The spring, 30, if mounted to the housing, 10, beyond the pivot point, 28, will act to hold the tray, 26, in the closed position shown or in the open position shown in phantom by dotted lines 32 in FIG. 2.

A second tray, 34, is located directly below the first tray, 26, and is made removable by sliding it out of the housing.

As shown in FIG. 2, the lower tray, 34, is provided with a number of walls 29, 31, 33, 35, forming separate bins for holding separate stacks of slides. The tray, 34, may be positioned so that any one of the bins is under the end of the chute, 16.

As shown in FIG. 2, a small raised portion, 40, may be employed to maintain the tray, 26, at a slight angle to horizontal when in the down position shown in FIG. 2. This tends to cause slides, 41, in the tray to slide towards the wall portion of the tray and stack more evenly. A similar raised portion, 44, serves the same purpose for the lower tray, 34.

As shown in FIGS. 2, 3, and 4, a slide, 17, at the viewing station, 20, is held in place by means of a detent, 22. The detent is connected by means of a pin to a lever, 24, shown in FIG. 1. When the lever is in the position shown, the detent, 22, holds the slide, 17, in place at the viewing station. This is shown in FIG. 3. When the lever, 24, is rotated counterclockwise by 90° the detent swings out of the way and the slide, 17, is free to drop by force of gravity off the end of the chute, 16, as shown in FIG. 4.

A light source may be provided opposite the viewing station, 20. Preferably, the light source includes a diffusing screen, 45, made of a plastic material and glued between the walls, 12 and 14. Attached to the diffusing screen, 45, is a reflector, 46, which holds a light bulb, 47. The light bulb is attached to a source of electricity, such as a battery or electrical outlet, not shown in FIG. 2.

The above-described slide viewer/sorter may be operated manually by inserting slides one by one onto the slide chute, 16. Alternatively, slides may be dropped by a slide-feeding mechanism onto the chute, 16, from a stack of slides held in a hopper. While any suitable hopper shown in the prior art, for example the mechanism described in the above-mentioned Rideout U.S. Pat. No. 2,849,814 may be used, the novel hopper shown in the present invention has certain advantages. This slide-feeding mechanism will now be described with reference to FIGS. 1, 2, and 5-7.

Figure 12:
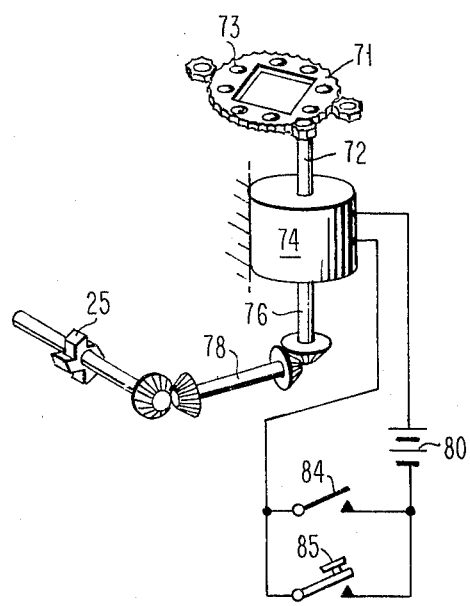
FIGS. 12 and 13 are views of a motor-driven gear mechanism to replace the linkage mechanism of FIG. 1, shown in the load and unload positions, respectively.
Figure 13:
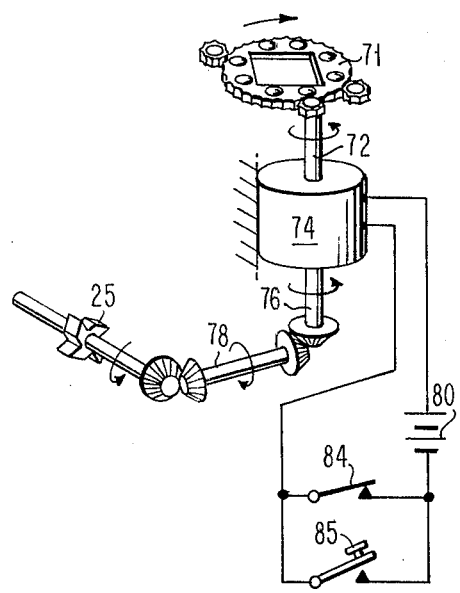

The slide-feeding mechanism is comprised of an upper portion, 50, a lower portion, 52, and a slide carrier, 54, sandwiched between the two. The mechanism is held together by bolts with spacers, 56, 58, 60, 62. The spacers hold the upper and lower portions apart so that the slide-carrier, 54, is free to move. The slide carrier is provided with an arm, 64, so that it can be rotated manually in a clockwise or counterclockwise direction. The arm, 64, may be operated manually either alone or in conjunction with lever 24 through a mechanical linkage, as shown in FIGS. 8 and 9. Alternatively, the mechanism may be operated by means of a motor and gears, as shown in FIGS. 12 and 13. The thickness of the space between the upper and lower portions is slightly larger than the width of a slide which is to pass through the mechanism.

The upper portion of the mechanism comprises a slide hopper, 68, which has appropriate dimensions to handle a stack of slides. The entire hopper, 68, is oriented at an angle of 45° to the slide chute, 16. This is more clearly shown in FIGS. 5-7.

Figure 5:
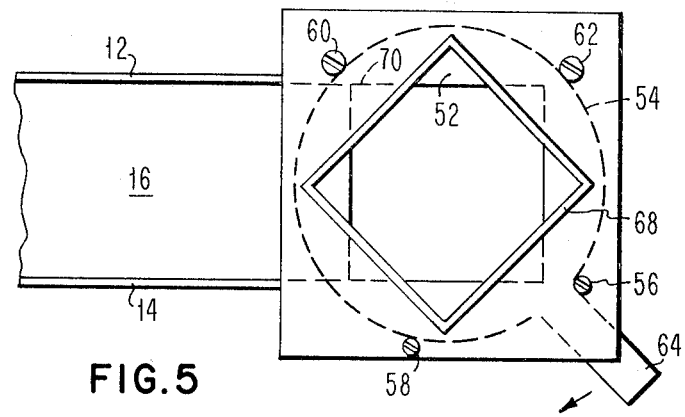
FIGS. 5, 6, and 7 are top views of the hopper mechanism shown in FIG. 1, shown respectively in the load, transit and unload positions.
Figure 6:
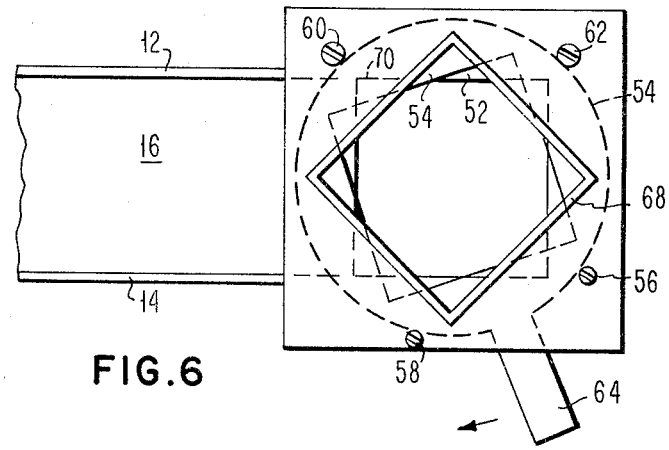
Figure 7:
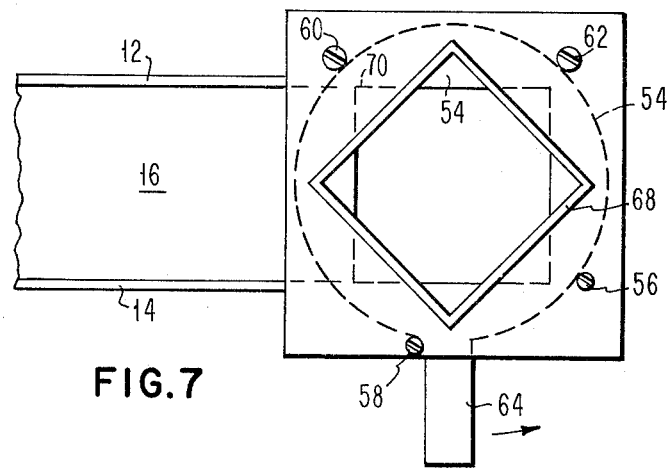

As shown in FIGS. 5-7, the lower portion, 52, has an opening, 70, cut therein large enough to admit a slide, and in alignment with the chute, 16.

The slide carrier, 54, has a similar opening cut therein and when in the load position shown in FIG. 5, this opening is in alignment with the hopper, 68, so that a slide in the hopper is able to drop by a force of gravity into the opening of the carrier, 54. However, the slide is restrained from dropping into the chute, 16, by the lower portion, 52.

Referring to FIG. 6, as the arm, 64, is rotated in a clockwise direction, the single slide in the carrier is rotated in the same direction.

Referring to FIG. 7, the slide is unloaded and drops into the chute, 16, when the arm, 64, reaches the position shown. This is because the opening in the slide carrier, 54, becomes aligned with the opening, 70, in the lower portion of the mechanism, thus allowing the slide to drop therethrough. Since the slide carrier, 54, is only thick enough to admit one slide, the remaining slides in the hopper are restrained from entering the opening as the carrier moves. The next slide in the stack is peeled off in a similar manner by returning the arm, 64, to the load position shown in FIG. 5.

The bolt and spacer, 56, is positioned to form a limit stop in the load position of the arm, 64, as illustrated in FIG. 5. The bolt and spacer, 58, is positioned to form a limit stop for the arm, 64, when the slide carrier is in the unload position shown in FIG. 7.

The mechanism can handle any thickness of slide by making the following modification. The following description assumes double thickness of a standard two-by-two paper-mounted slide. However, it should be understood that a slide of any thickness can be handled by utilizing the following principles.

To handle a slide of double thickness, a second slide carrier identical to the carrier, 54, is placed between the upper and lower portions, 50, 52. Both carriers are rotated to the load position which allows two slides of single thickness to drop into the region between the two portions, or a single slide of double thickness to drop into the region. If a single-thickness slide is to be transported, only the arm of the lower carrier is rotated to the unload position, the arm of the upper carrier remaining stationary in the load position. This peels off the single slide in much the same manner as described previously with respect to FIGS. 5-7. If, on the other hand, a double-thickness slide has dropped into the region between the upper and lower portions, then the arm of both slide carriers are rotated to carry the single double-thickness slide to the unload position.

Multiple slide carriers can be provided to increase the thickness of the slide transported to three, four, etc. thicknesses.

The detent mechanism and the slide-feeding mechanism can be operated separately or can be actuated by means of a linkage connected between the lever, 24, and the arm, 64 (FIG. 1). This linkage is comprised of an arm, 15, attached to the lever, 24, and pivotally attached to an adjustable linkage, 19. The linkage, 19, is also pivotally attached to a second linkage, 21, which is connected to a pivot point, 23, attached to the body of the slide viewer, 10. The linkage, 21, is connected to the arm, 64. A spring, 18, is provided to return the lever, 24, to the slide restraining position.

Referring to FIG. 8, when the lever, 24, is pressed downward in a counterclockwise direction, the linkage move in the direction of the arrows to thus move the detent, 22, to the release position and the slide carrier, 54, to the load position. When the lever, 24, is released, the spring, 18, causes the mechanism to return to the unload position. In this position the detent, 22, is in the slide restraining position, and a slide in the carrier, 54, drops onto the chute, 16, shown in FIG. 1.

Figure 10:
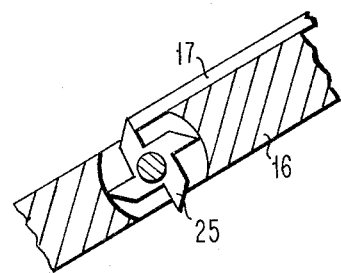
FIG. 10 is an enlarged sectional view of another slide restraining detent shown in the slide restraining position.
Figure 11:
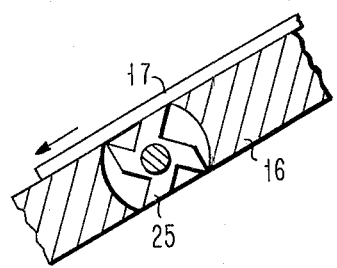
FIG. 11 is an enlarged sectional view of the detent of FIG. 10 shown in the releasing position.

Alternatively, the entire mechanism can be automated to operate by means of a pushbutton and a motor-driven gear mechanism. A different slide restraining mechanism is utilized, illustrated in FIGS. 10 and 11. This mechanism performs the detent function when rotated each 45 degrees in a counterclockwise direction. Thus, when in the position shown in FIG. 10, the detent mechanism, 25, restrains the slide, 17, as shown. When rotated 45 degrees in a counterclockwise direction, the detent releases the slide, 17, as shown in FIG. 11.

By utilizing a gear mechanism as shown in FIGS. 12 and 13, between this type of detent and a slide carrier, 71, the entire mechanism can be automated. The slide carrier, 71, in this case is provided with gear teeth which mesh with gear teeth on a drive shaft, 72, driven by a motor, 74. A further drive shaft, 76, having gears thereon, meshes with gears on a drive shaft, 78, which is connected through gears to the detent, 25. The motor is driven by means of a suitable electrical source such as a battery, 80. A cam switch, 84, is normally held open by cams, 73, on the slide carrier, 71, or on the motor shaft. These cams are spaced every one-eighth of the circumference of the shaft or carrier. A pushbutton switch, 85, is provided to initially energize the motor. When the switch, 85, is energized, the motor, 74, begins to turn, and as it turns, the cam switch, 84, moves off of the cam and closes. The pushbutton switch can now be released and the motor will continue to turn as shown in FIG. 13. After completing one-eighth of a turn, the next cam on the slide carrier, 71, disengages the cam switch and stops the motor.

The gear mechanism driven by drive shaft, 76, drives the detent, 25, in synchronism with the slide carrier, 71, also one-eighth of a turn, in the direction shown by the arrow (FIG. 13). The detent, 25, is in the release position (shown in FIG. 11) when the slide carrier, 71, is in the load position (FIG. 12). Similarly, the detent, 25, is in the restrain position (FIG. 10) when the slide carrier, 71, is in the unload position (FIG. 13).

SUMMARY

In order to view a number of slides sequentially, and sort them into two separate stacks, the arm, 64, is first moved to the load position (FIG. 1). A stack of slides is then placed in the hopper, 68. The arm, 64, is then moved to the unload position, allowing a single slide to drop through the opening, 70, onto the chute, 16, where it drops by force of gravity to the viewing station, 20. After viewing the slide, it is allowed to drop into one of the slide trays, 26, 34, by depressing the lever, 24, which causes the detent, 22, to swing out of the way. The slide then drops by force of gravity into the first or upper tray, 26. If it is desired to drop the slide into the second or lower tray, 34, the tray, 26, is swung out of the way by pulling it back before depressing the lever, 24.

The arm, 64, is now returned to the load position, to load the next slide into the carrier. Then the cycle is complete.

The sorted slides are unloaded by swinging the tray, 26, back and lifting out the slides, and by pulling the tray, 34, back and lifting out the slides therein.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A slide-handling mechanism comprising:
    a chute oriented at an incline to horizontal adapted to receive a photographic slide, for providing a passage through which said slide may pass from an upper end of the chute to a lower end of the chute by force of gravity; and
    a first slide receptacle positioned at the lower end of said chute for receiving a slide dropping off the end of said chute;
    whereby a slide placed in said chute at the upper end thereof drops by force of gravity to the lower end of said chute where said slide is free to exit said chute and drop into said receptacle.

2. The slide mechanism in accordance with claim 1 further comprising a second slide receptacle positioned below said first slide receptacle and adapted to receive a slide dropping off the lower end of said chute, whereby slides may be sorted into at least two separate stacks depending upon whether or not said first slide receptacle is in position above said second slide receptacle.

3. The slide mechanism in accordance with claim 1 further comprising:
    means positioned between said upper and lower ends of said chute for restraining a slide at a viewing station when said restraining means is in a first position and for releasing said slide when said restraining means is in a second position;
    whereby a slide placed in said chute at said upper end is free to slide to said viewing station for viewing thereof when said restraining means is in said first position, and whereby said slide is free to exit said chute at the lower end thereof when said restraining means is in said second position.

4. The mechanism in accordance with claim 3 further comprising:
    means located above said upper end of said chute for dropping slides, one by one, onto said chute at said upper end thereof.

5. The mechanism in accordance with claim 4 further comprising:
    first means for activating said restraining means to place said means in said first position, and,
    second means for activating said slide-holding means to thereby drop a slide onto said chute;
    whereby a slide in said slide-holding means is dropped onto said chute, where it drops by force of gravity to said restraining means and upon deactivation of said restraining means is released to exit the lower end of said chute.

6. The combination in accordance with claim 4 wherein said means for dropping slides onto said chute further comprises:
    a first upper portion for holding slides in a vertical stack, said upper portion having a first opening therein of such size and dimensions as to allow a slide to pass therethrough;

a second lower portion having a second opening therein of such size and dimensions as to allow a slide to pass therethrough provided that said slide is oriented in the horizontal plane in alignment with said second opening;

said second lower portion being positioned at an angle, in the horizontal plane, with said first opening in said upper portion, so that a slide passing through said first opening in said upper portion is unable to pass through said second opening in said lower portion without being reoriented; and slide carrier means positioned between said upper portion and said lower portion, said carrier means having a third opening therein of such size and dimensions as to allow a slide to pass therethrough, said carrier being movable in the horizontal plane from a first position wherein said third opening in said slide carrier is in alignment with said first opening in said upper portion, to a second position wherein said third opening in said slide carrier is in alignment with said second opening in said lower portion.

7. The apparatus in accordance with claim 6 wherein said slide carrier is provided with first means for registering the opening in said slide carrier in alignment with the opening in said upper portion when in said first position, and second means for registering the opening in said slide carrier in alignment with the opening in said lower portion when in said second position.

8. The combination in accordance with claim 1 wherein said first slide receptacle is an L-shaped tray, rotatably mounted such that said tray can be rotated out from under the lower end of said chute.

9. The combination in accordance with claim 8 further comprising a spring in coaction with said tray for holding said tray in position at the lower end of said chute.

10. The combination in accordance with claim 8 further comprising means for maintaining said tray at an angle to horizontal when in position at the lower end of said chute, so that slides dropped off the end of said chute slide towards one end of said tray, thereby stacking evenly.

11. The combination in accordance with claim 1 wherein said first slide receptacle is a slidably-mounted tray, positioned under said lower end of said chute, such that said tray may be slid out from under the lower end of said chute.

12. The combination in accordance with claim 11 wherein said tray is provided with a number of walls forming separate bins capable of holding separate stacks of slides, whereby said tray may be repositioned so that any one of said bins is located under said lower end of said chute, thereby permitting slides dropping off of said chute to be stacked in the respective bin positioned under said chute.

13. The combination in accordance with claim 11 further comprising means for maintaining said tray at an angle to horizontal when in position at the lower end of said chute, so that slides dropped off the end of said chute slide towards one end of the tray, thereby stacking more evenly.

14. The combination in accordance with claim 2 wherein said first slide receptacle is an L-shaped tray, rotatably mounted such that said tray can be rotated out from under the lower end of said chute.

15. A slide-handling mechanism comprising:

a first upper portion for holding slides in a vertical stack, said upper portion having a first opening therein of such size and dimensions as to allow a slide to pass therethrough;

a second lower portion having a second opening therein of such size and dimensions as to allow a slide to pass therethrough provided that said slide is oriented in the horizontal plane in alignment with said second opening;

said second lower portion being positioned at an angle, in the horizontal plane, with said first opening in said upper portion, so that a slide passing through said first opening in said upper portion is unable to pass through said second opening in said lower portion without being reoriented; and slide carrier means positioned between said upper portion and said lower portion, said carrier means having a third opening therein of such size and dimensions as to allow a slide to pass therethrough, said carrier being movable in the horizontal plane from a first position wherein said third opening in said slide carrier is in alignment with said first opening in said upper portion, to a second position wherein said third opening in said slide carrier is in alignment with said second opening in said lower portion.

16. The apparatus in accordance with claim 15 wherein said slide carrier is provided with first means for registering the opening in said slide carrier in alignment with the opening in said upper portion when in said first position, and second means for registering the opening in said slide carrier in alignment with the opening in said lower portion when in said second position.

17. The slide-handling mechanism in accordance with claim 15, further comprising:

a chute oriented at an incline to horizonal and in alignment with said second opening in said second lower portion, adapted to receive a slide, for providing a passage through which said slide may pass from an upper end of the chute to a lower end of the chute by force of gravity; and a first slide receptacle positioned at the lower end of said chute for receiving a slide dropping off the end of said chute;

whereby a slide dropped in said chute at the upper end thereof drops by force of gravity to the lower end of said chute where said slide is free to exit said chute and drop into said receptacle.

18. The slide mechanism in accordance with claim 17 further comprising a second slide receptacle positioned below said first slide receptacle and adapted to receive a slide dropping off the lower end of said chute, whereby slides may be sorted into at least two separate stacks depending upon whether or not said first slide receptacle is in position above said second slide receptacle.

19. The slide mechanism in accordance with claim 17 further comprising:

means positioned between said upper and lower ends of said chute for restraining a slide at a viewing station when said restraining means is in a first position and for releasing said slide when said restraining means is in a second position;

whereby a slide dropped in said chute at said upper end is free to slide to said viewing station for viewing thereof when said restraining means is in said first position, and whereby said slide is free to exit said chute at the lower end thereof when said restraining means is in said second position.

20. The mechanism in accordance with claim 19 further comprising:
first means for activating said restraining means to place said means in said first position, and,
second means for activating said slide carrier means to thereby drop a slide onto said chute;
whereby a slide in said slide-holding means is dropped onto said chute, where it drops by force of gravity to said restraining means and upon deactivation of said restraining means is released to exit the lower end of said chute.

21. The combination in accordance with claim 17 wherein said first slide receptacle is an L-shaped tray, rotatably mounted such that said tray can be rotated out from under the lower end of said chute.

22. The combination in accordance with claim 21 further comprising a spring in coaction with said tray for holding said tray in position at the lower end of said chute.

23. The combination in accordance with claim 21 further comprising means for maintaining said tray at an angle to horizontal when in position at the lower end of said chute, so that slides dropped off the end of said chute slide towards one end of said tray, thereby stacking evenly.

24. The combination in accordance with claim 17 wherein said first slide receptacle is a slidably-mounted tray, positioned under said lower end of said chute, such that said tray may be slid out from under the lower end of said chute.

25. The combination in accordance with claim 24 wherein said tray is provided with a number of walls forming separate bins capable of holding separate stacks of slides, whereby said tray may be repositioned so that any one of said bins is located under said lower end of said chute, thereby permitting slides dropping off of said chute to be stacked in the respective bin positioned under said chute.

26. The combination in accordance with claim 24 further comprising means for maintaining said tray at an angle to horizontal when in position at the lower end of said chute, so that slides dropped off the end of said chute slide towards one end of tray, thereby stacking more evenly.

27. The combination in accordance with claim 18 wherein said first slide receptacle is an L-shaped tray, rotatably mounted such that said tray can be rotated out from under the lower end of said chute.

* * * * *